United States Patent
Le et al.

(10) Patent No.: US 9,371,859 B2
(45) Date of Patent: Jun. 21, 2016

(54) MOTOR INCLUDING RESERVOIR AND HUB CAP

(71) Applicant: SEAGATE TECHNOLOGY LLC, Cupertino, CA (US)

(72) Inventors: Lynn Bich-Quy Le, San Jose, CA (US); Christopher Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 600 days.

(21) Appl. No.: 13/907,838

(22) Filed: May 31, 2013

(65) Prior Publication Data
US 2013/0259413 A1    Oct. 3, 2013

Related U.S. Application Data

(63) Continuation-in-part of application No. 12/117,619, filed on May 8, 2008.

(51) Int. Cl.
*F16C 32/06* (2006.01)
*F16C 33/10* (2006.01)

(52) U.S. Cl.
CPC ........... *F16C 33/107* (2013.01); *F16C 33/1085* (2013.01); *F16C 2370/12* (2013.01)

(58) Field of Classification Search
CPC .... F16C 33/107; F16C 33/1085; F16C 33/74; F16C 33/741; F16C 33/743; F16C 33/745; F16C 2370/12
See application file for complete search history.

(56) References Cited

U.S. PATENT DOCUMENTS

| | | | | |
|---|---|---|---|---|
| 8,613,552 B2 * | 12/2013 | Fuss | ..................... | F16C 33/1085 384/107 |
| 8,670,209 B2 * | 3/2014 | Sekii | ..................... | F16C 17/107 310/90 |
| 8,675,304 B2 * | 3/2014 | Tamaoka | .............. | F16C 17/107 310/67 R |
| 8,773,816 B1 * | 7/2014 | Sato | ..................... | F16C 17/107 310/90 |
| 8,794,839 B2 * | 8/2014 | Kimura | ................. | F16C 33/107 384/119 |
| 8,807,836 B2 * | 8/2014 | Kodama | ............. | F16C 32/0659 384/107 |
| 2004/0264819 A1 | 12/2004 | Weingord et al. | | |
| 2006/0039636 A1 | 2/2006 | Ichiyama | | |
| 2010/0315742 A1 * | 12/2010 | Kimura | ................... | F16C 17/10 360/224 |
| 2013/0234552 A1 * | 9/2013 | Kodama | .................. | H02K 5/16 310/90 |
| 2014/0368951 A1 * | 12/2014 | Lee | ....................... | F16C 17/107 360/99.08 |

FOREIGN PATENT DOCUMENTS

DE    102011014369    *  9/2012  ............ F16C 17/107

OTHER PUBLICATIONS

Translation of DE102011014369 obtained Feb. 29, 2016.*

* cited by examiner

*Primary Examiner* — James Pilkington

(57) ABSTRACT

Provided herein is an apparatus, including a stationary component; a rotatable component; a fluid dynamic bearing defined by the stationary component and the rotatable component; a first channel substantially parallel to the fluid dynamic bearing; a second channel substantially perpendicular to the first channel; and a fluid reservoir substantially parallel to the first channel, wherein the second channel fluidly connects the fluid reservoir to the first channel.

25 Claims, 12 Drawing Sheets

MOTOR INCLUDING RESERVOIR AND HUB CAP

CROSS REFERENCE

Figure 1:
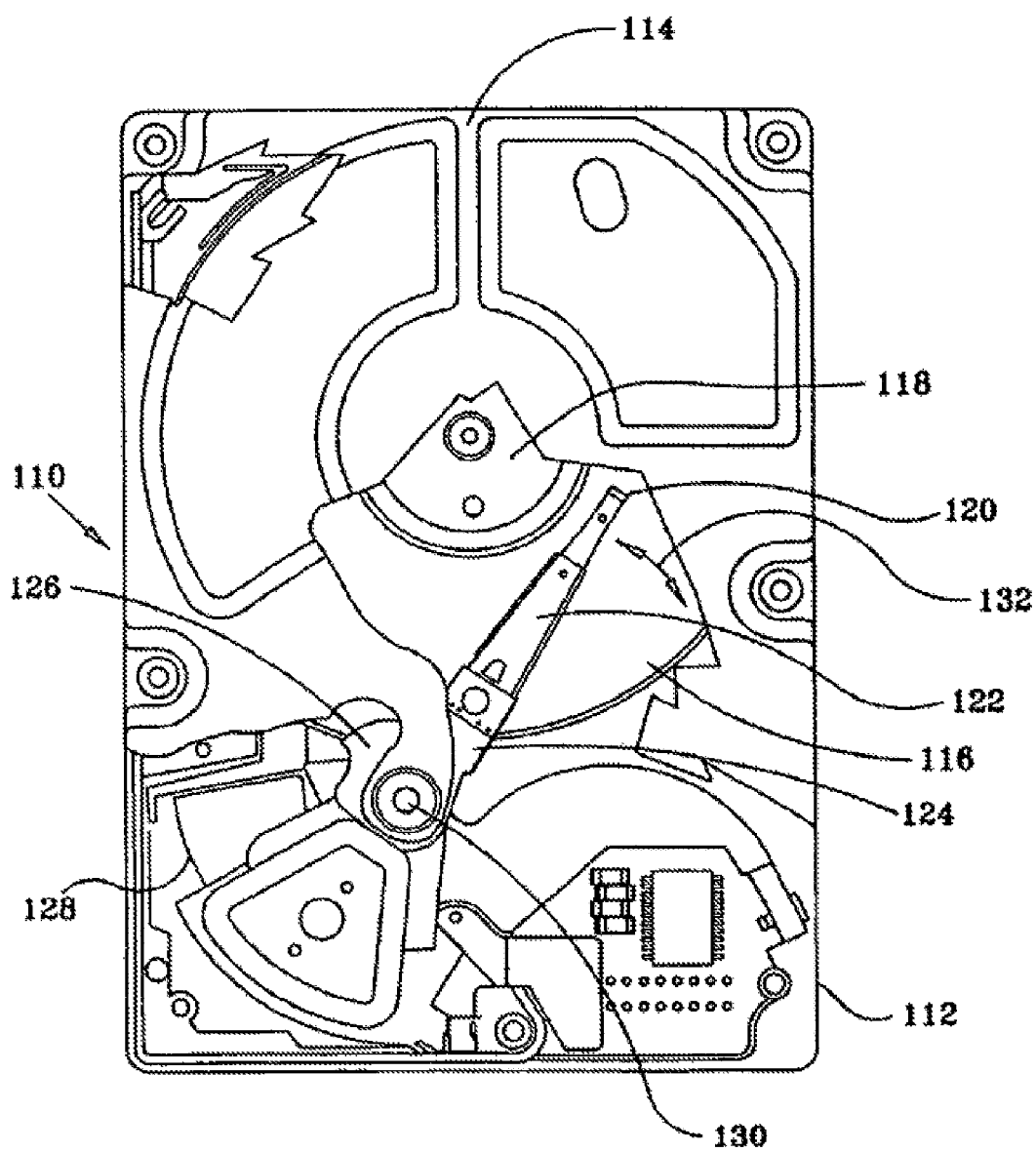

This application is a continuation-in-part of co-pending U.S. patent application Ser. No. 12/117,619, filed May 8, 2008.

BACKGROUND

Disk drive memory systems store digital information that is recorded on concentric tracks on a magnetic disk medium. At least one disk is rotatably mounted on a spindle, and the information, which can be stored in the form of magnetic transitions within the discs, is accessed using read/write heads or transducers. A drive controller is typically used for controlling the disk drive system based on commands received from a host system. The drive controller controls the disk drive to store and retrieve information from the magnetic discs. The read/write heads are located on a pivoting arm that moves radially over the surface of the disk. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disk drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disk to ensure the proper reading and writing of information. Moreover, a demand exists for increased storage capacity and smaller disk drives, which has led to the design of higher recording areal density such that the read/write heads are placed increasingly closer to the disk surface. Precise alignment of the heads with the storage tracks is needed to allow discs to be designed with greater track densities, thereby allowing smaller discs and/or increasing the storage capacity of the discs. Because rotational accuracy is critical, many disk drives presently utilize a spindle motor having a fluid dynamic bearing (FDB) situated between a shaft and sleeve to support a hub and the disk for rotation. In a hydrodynamic bearing, a lubricating fluid is provided between a fixed member bearing surface and a rotating member bearing surface of the disk drive. Hydrodynamic bearings, however, suffer from sensitivity to external loads or mechanical shock. In particular, the stiffness of the fluid dynamic bearing is critical so that the rotating load is accurately and stably supported on the spindle without wobble or tilt. Further, with disk drive memory systems being utilized in progressively more environments including mobile environments, reduced power consumption by the motor is desired.

SUMMARY

Provided herein is an apparatus, including a stationary component; a rotatable component; a fluid dynamic bearing defined by the stationary component and the rotatable component; a first channel substantially parallel to the fluid dynamic bearing; a second channel substantially perpendicular to the first channel; and a fluid reservoir substantially parallel to the first channel, wherein the second channel fluidly connects the fluid reservoir to the first channel.

These and other aspects and features of the invention may be better understood with reference to the following drawings, description, and appended claims.

DRAWINGS

FIG. 1 provides a top plan view of a disk drive data storage system in accordance with an embodiment.

Figure 2:
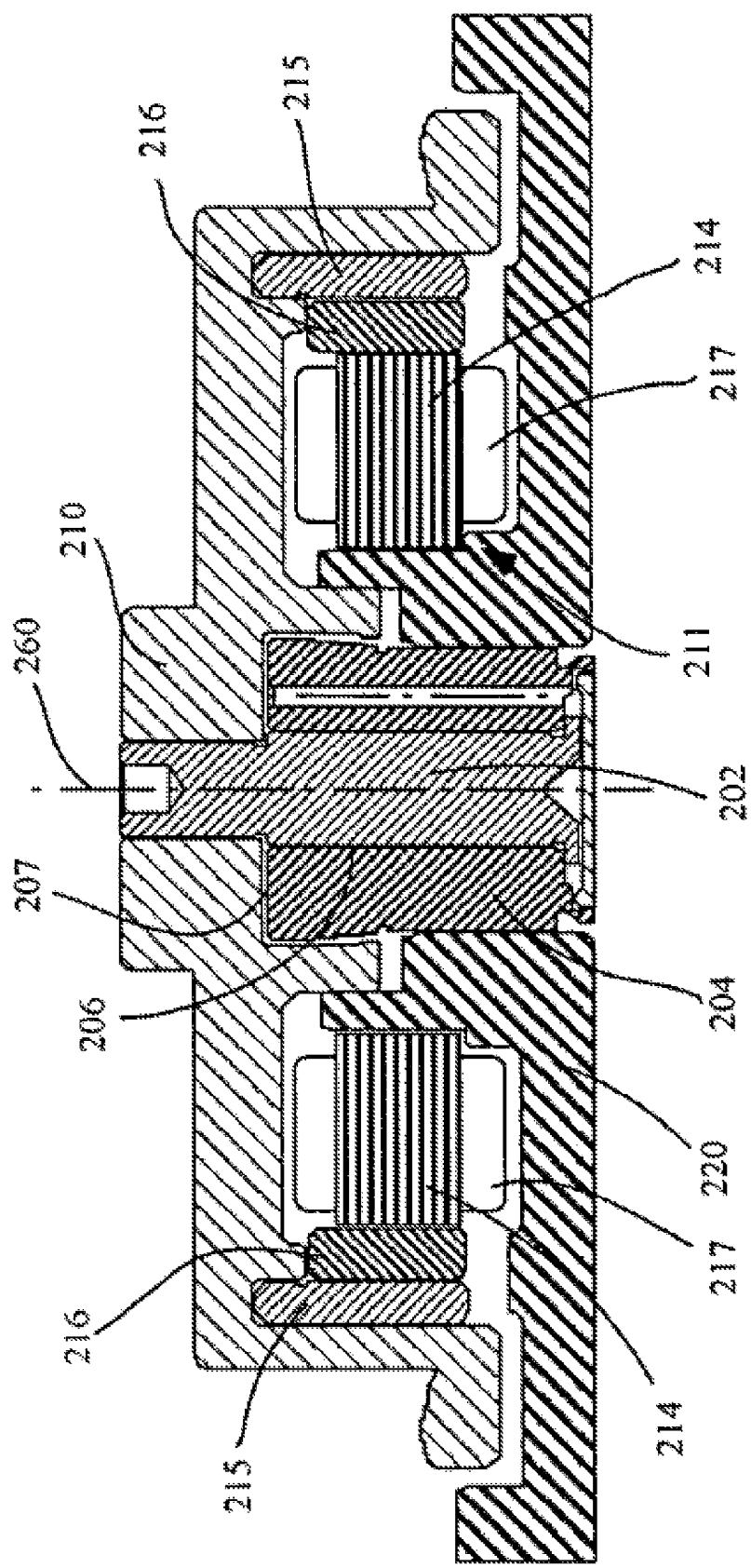

FIG. 2 provides a sectional side view of a contemporary spindle motor used in a disk drive data storage system incorporating a rotatable shaft and stationary sleeve in accordance with an embodiment.

Figure 3:
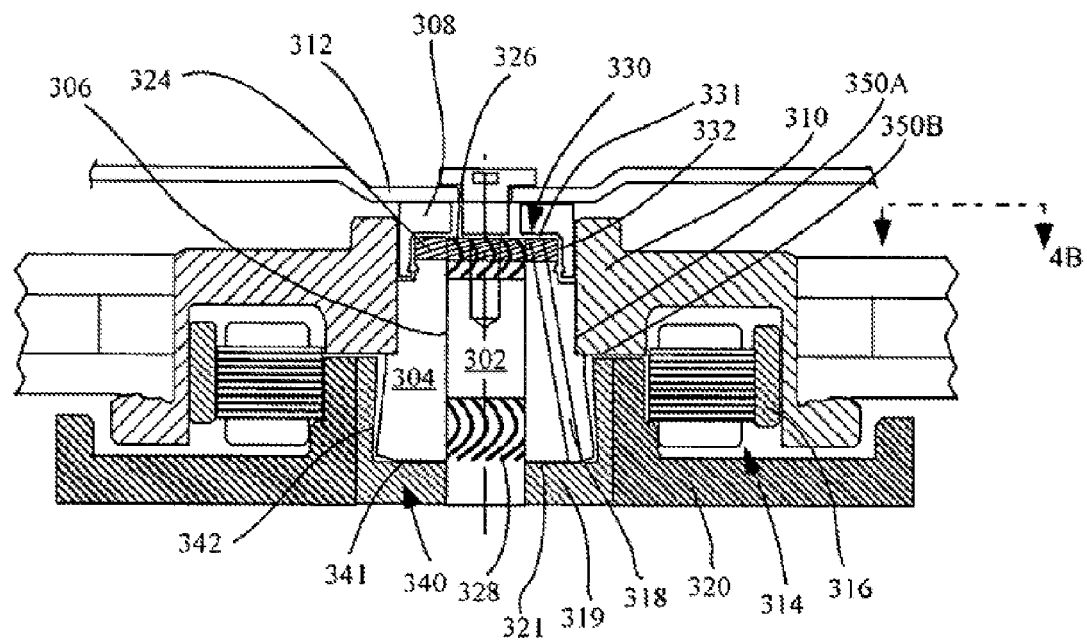

FIG. 3 provides a sectional side view of a fluid dynamic bearing motor incorporating a fixed shaft and folded fluid channels in accordance with an embodiment.

Figures 4A, 4B:
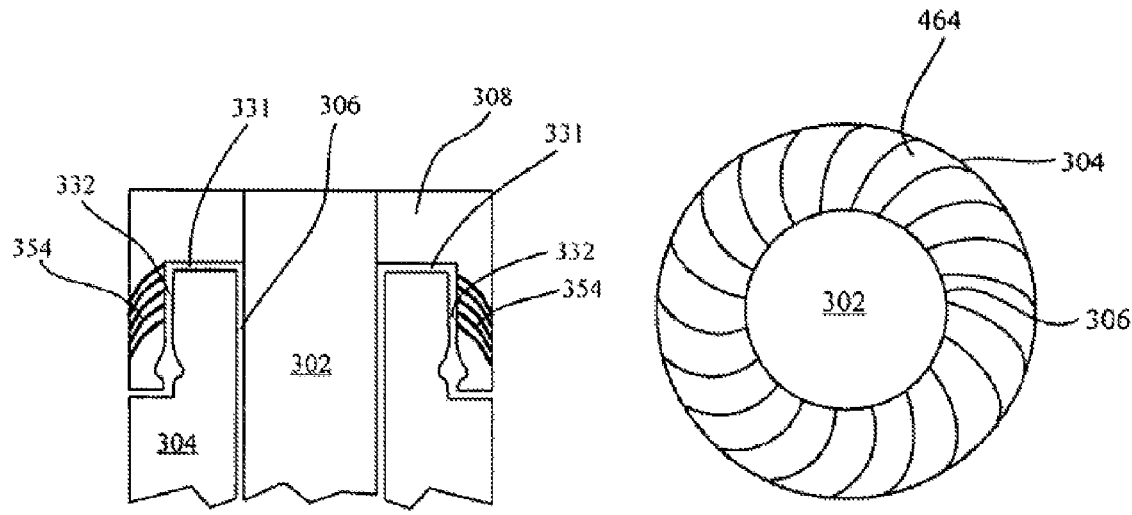

FIG. 4A provides a sectional side view of an enlarged portion of the fluid dynamic bearing motor as in FIG. 3, illustrating details of a folded fluid channel and grooves in accordance with an embodiment.

FIG. 4B provides a top plan view of an enlarged portion of the fluid dynamic bearing motor taken from the reference 4B as shown in FIG. 3, illustrating grooves on a radially extending portion of a surface of the folded fluid channel in accordance with an embodiment.

Figure 5:
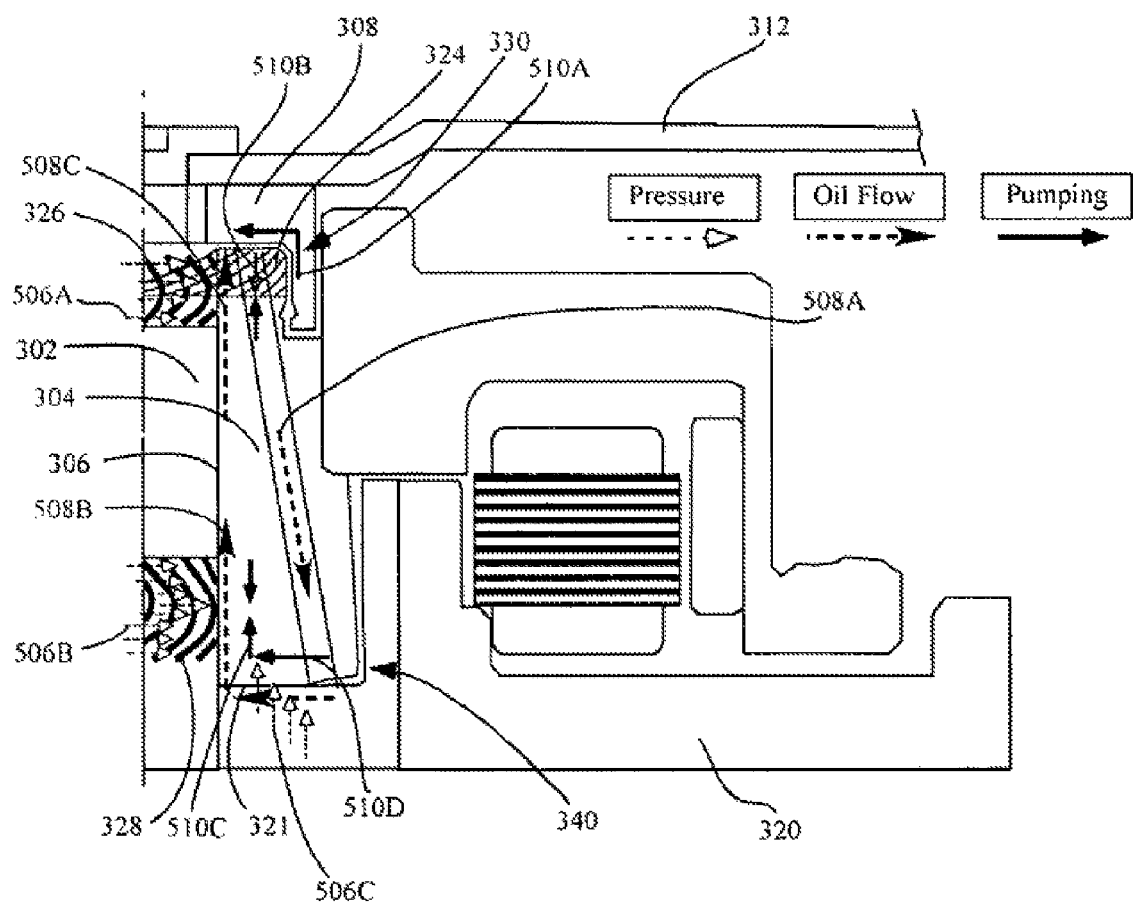

FIG. 5 provides a sectional side view of an enlarged portion of the fluid dynamic bearing motor as in FIG. 3, illustrating pressure, oil flow, and pumping details of the motor in accordance with an embodiment.

Figure 6:
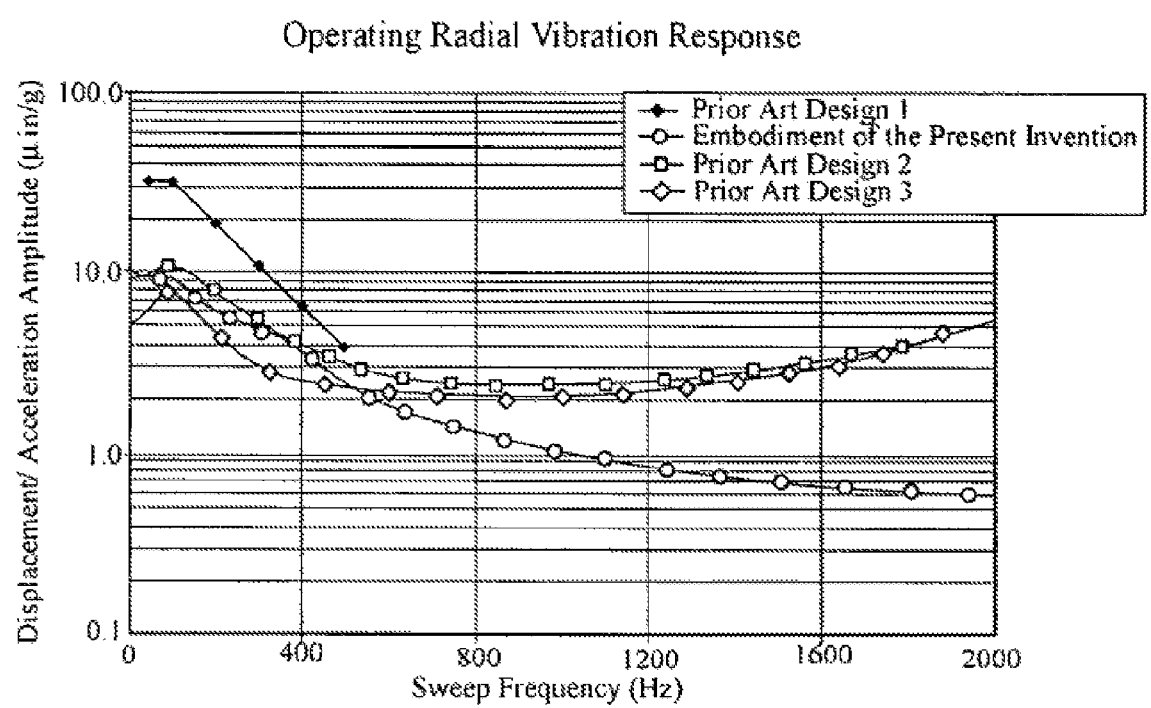

FIG. 6 provides a graphical illustration of operating radial vibration response simulations for three prior art designs versus an embodiment.

Figure 7A:
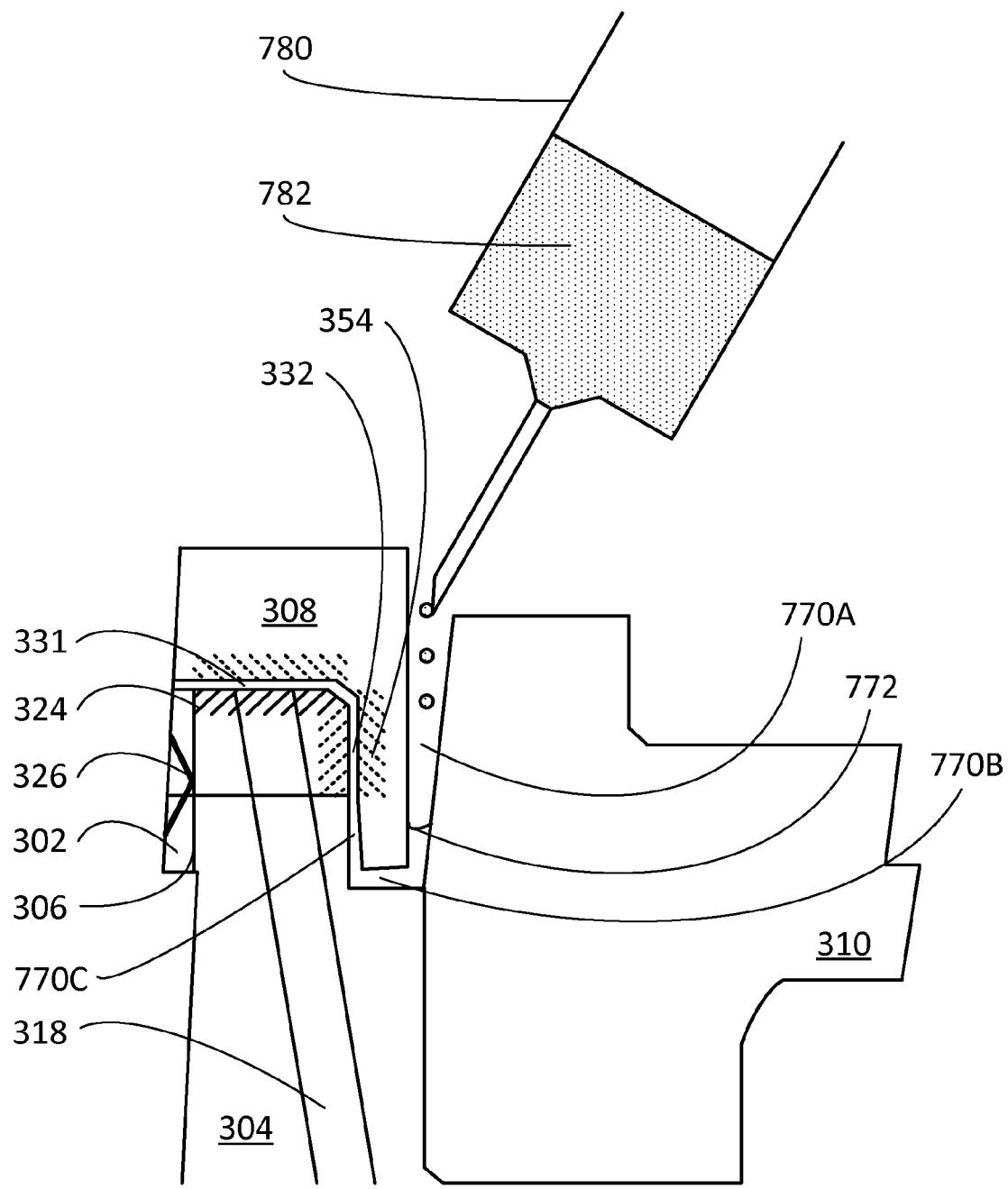

FIG. 7A provides a sectional side view of a fluid dynamic bearing motor incorporating a reservoir for a lubricating oil in accordance with some embodiments.

Figure 7C:
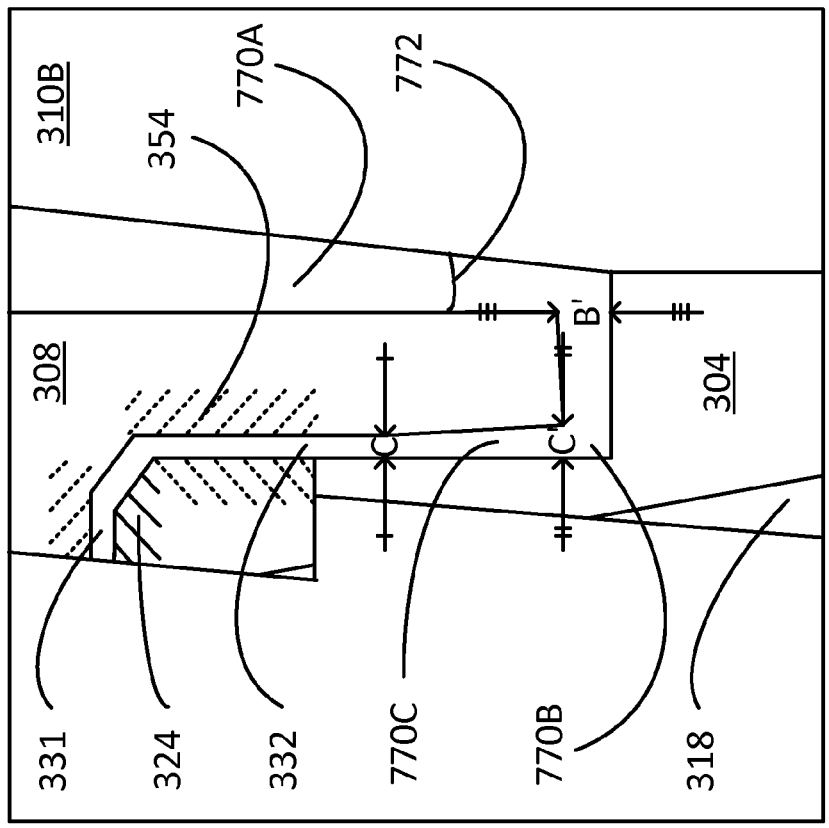
Figure 7B:
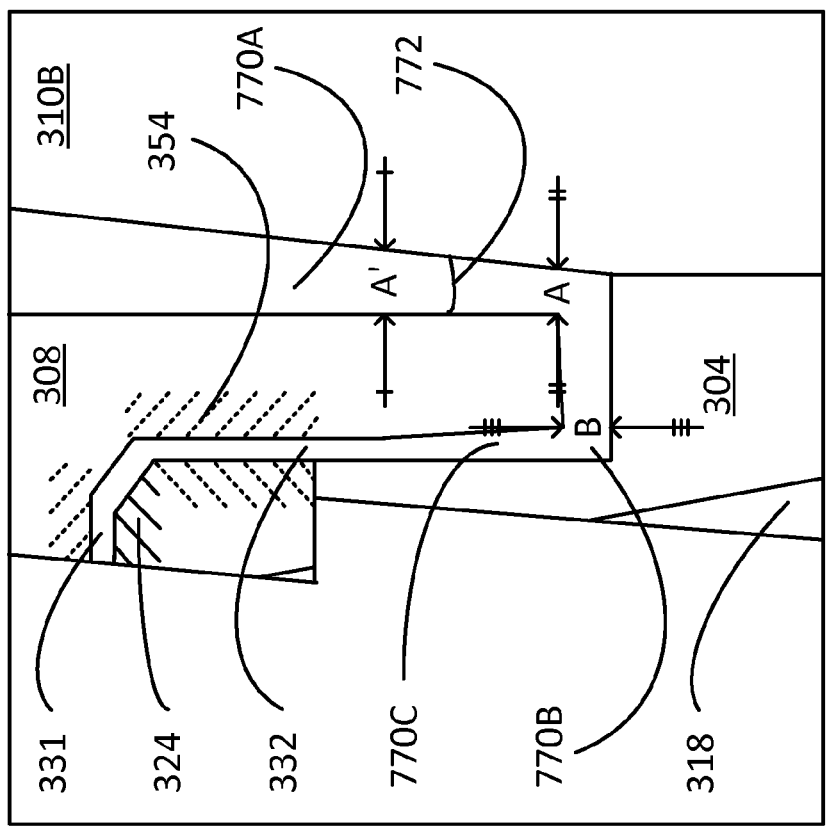

FIG. 7B provides a close-up of the sectional side view of the fluid dynamic bearing motor of FIG. 7A.

FIG. 7C provides a close-up of the sectional side view of the fluid dynamic bearing motor of FIG. 7A.

Figure 8A:
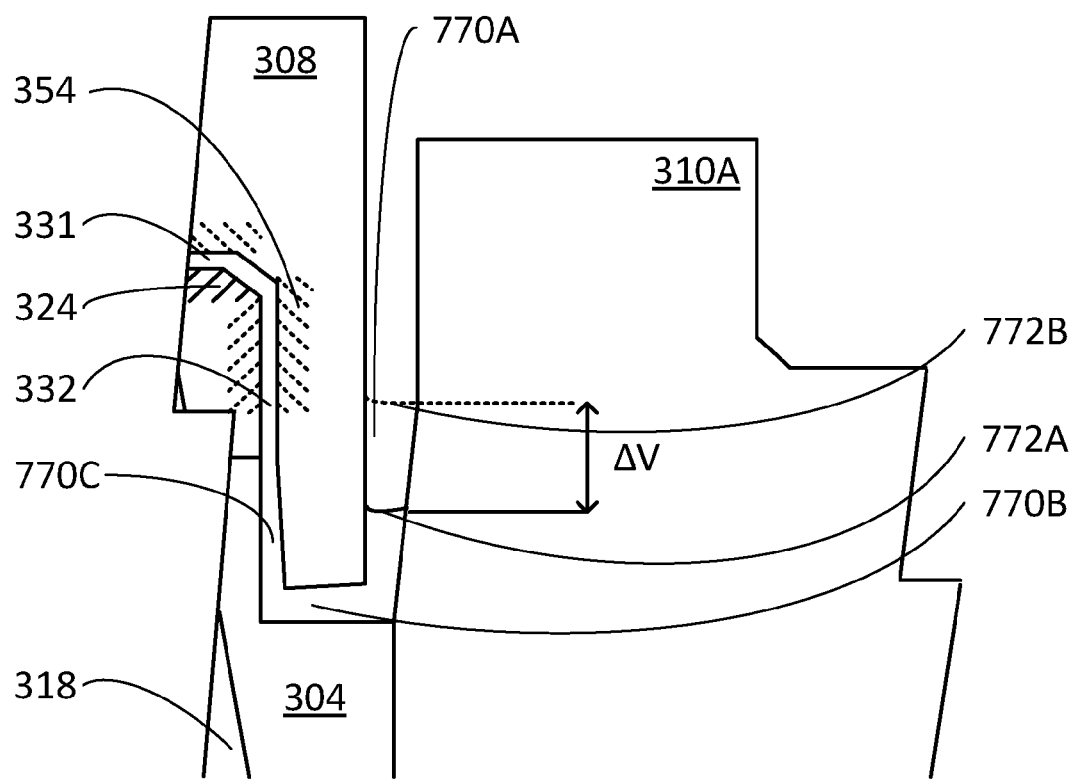
Figure 8B:
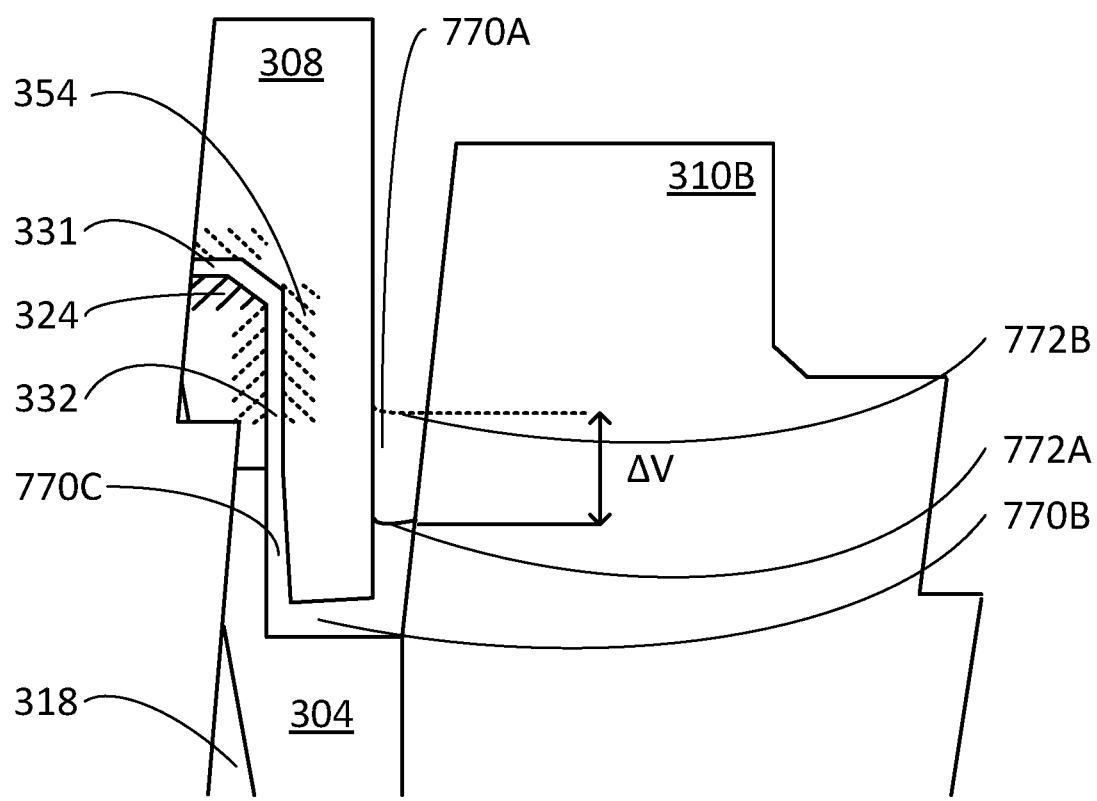
Figure 8C:
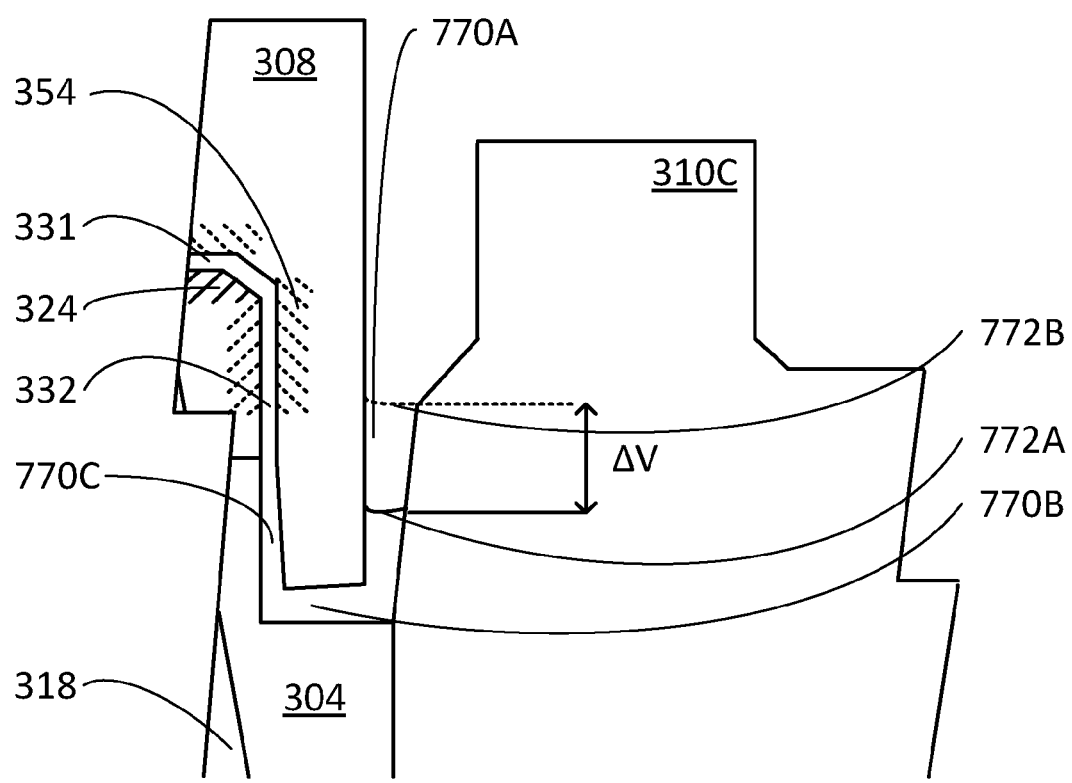

FIGS. 8A, 8B, and 8C provide a sectional side views of a fluid dynamic bearing motor incorporating a reservoir for a lubricating oil in accordance with some embodiments.

Figure 9A:
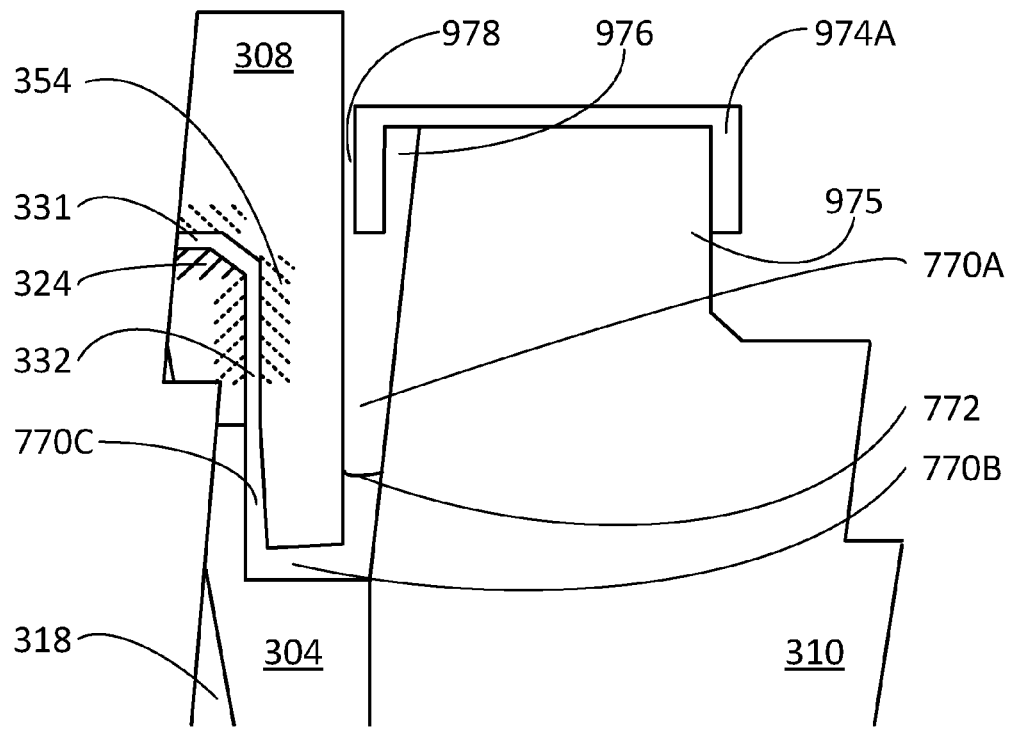

FIG. 9A provides a sectional side view of a fluid dynamic bearing motor incorporating a reservoir for a lubricating oil and a hub cap in accordance with some embodiments.

Figure 9B:
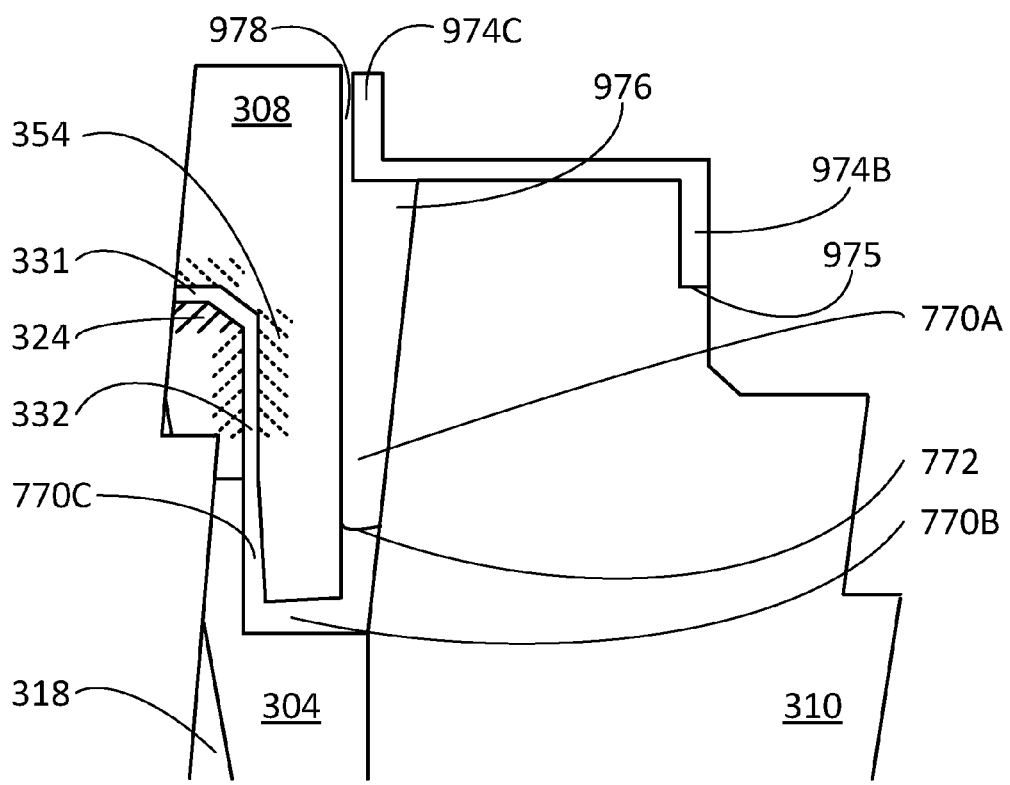

FIG. 9B provides a sectional side view of a fluid dynamic bearing motor incorporating a reservoir for a lubricating oil and a hub cap in accordance with some embodiments.

Figure 10A:
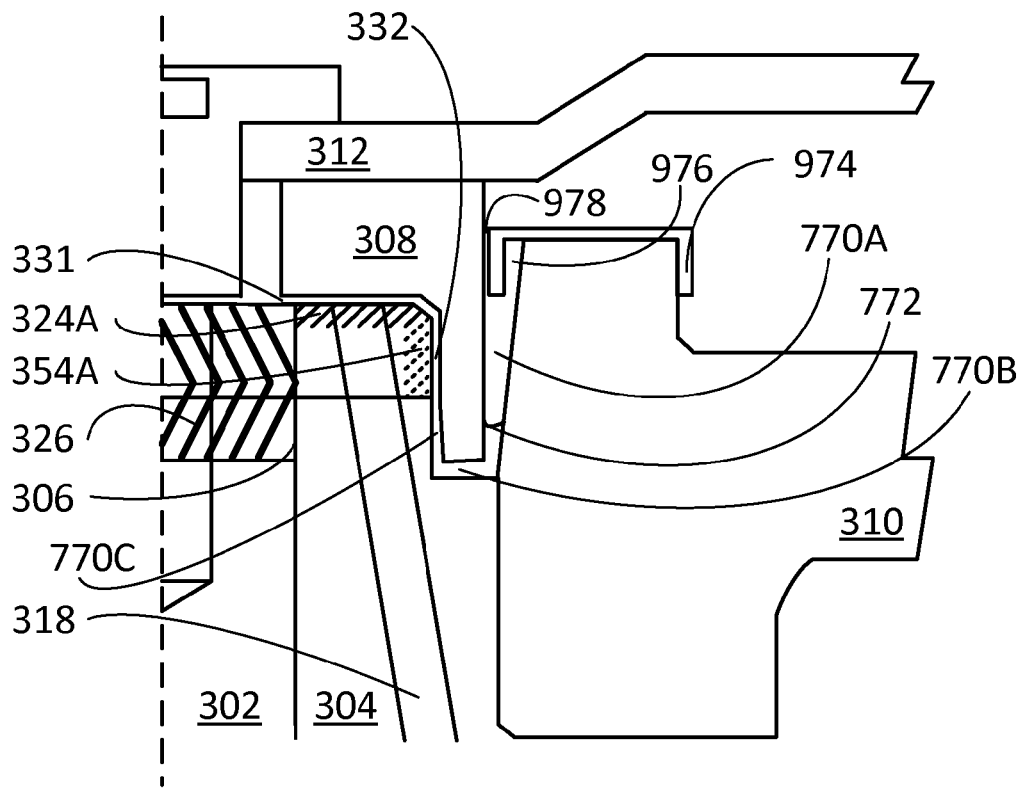

FIG. 10A provides a sectional side view of a fluid dynamic bearing motor incorporating a reservoir and a hub cap in accordance with some embodiments.

Figure 10B:
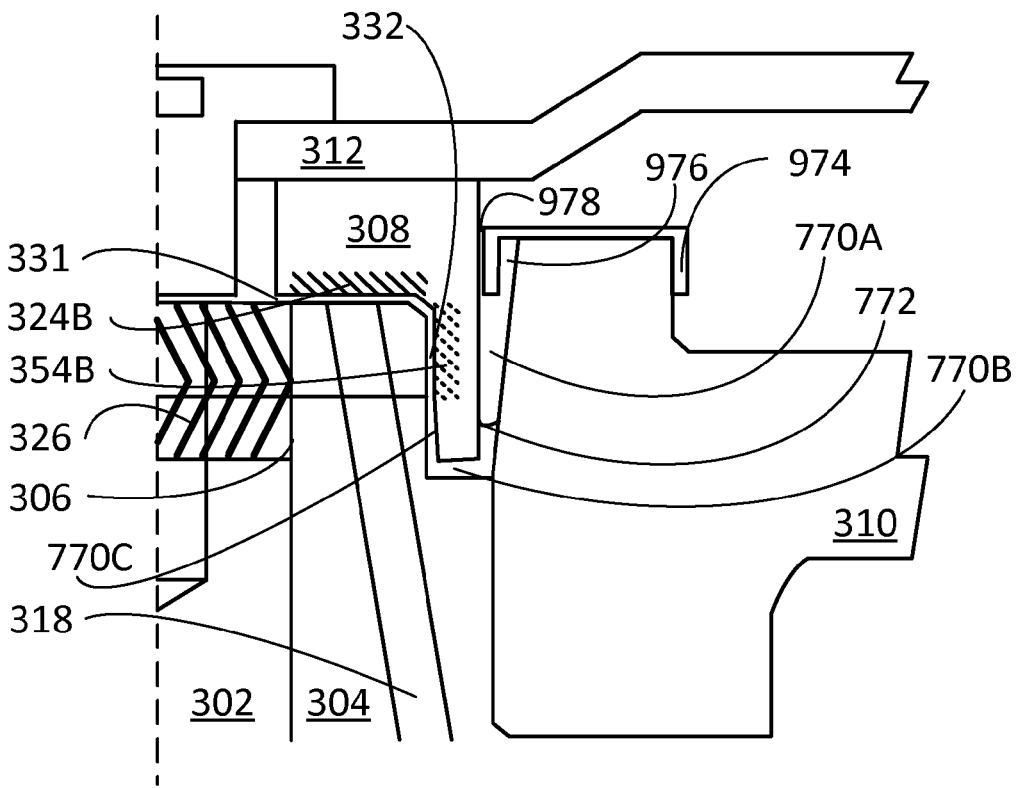

FIG. 10B provides a sectional side view of a fluid dynamic bearing motor incorporating a reservoir and a hub cap in accordance with some embodiments.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

A system and method are described herein for application to a fluid dynamic bearing motor. A fluid dynamic bearing is defined between a stationary component and a rotatable component. A shaft and a base structure are affixed to the stationary component. A first fluid sealing system is connected to a first axial end of the bearing, and a second fluid sealing system is connected to a second axial end of the bearing. The first fluid sealing system employs a first folded fluid channel and the second fluid sealing system employs a second folded fluid channel, wherein the first and the second folded fluid channels are defined by facing surfaces of the stationary component and the rotatable component. The first fluid sealing system forms an active pumping seal for pumping fluid when the stationary component and the rotatable component are relatively rotating. The first folded fluid channel is limited to occupying at least a portion of the same axial space as the bearing, and positioned radially outboard of the bearing. The first and the second folded fluid channels are shaped for maximizing bearing axial span and establishing angular stiffness to resist gyroscopic rocking of the facing bearing surfaces. By employing a rigid shaft design, significantly lower amplitude radial vibration responses at higher frequencies is exhibited compared with prior art motor designs employing a rotating shaft design. In an embodiment, top cover attached shaft and a single thrust surface is employed, allowing for a rigid structure and power reduction in applications including high rotational speed disk drives.

It will be apparent that features of the discussion and claims may be utilized with disk drive memory systems, low profile disk drive memory systems, spindle motors, brushless DC motors, various fluid dynamic bearing designs including hydrodynamic and hydrostatic bearings, and other motors employing a stationary and a rotatable component, including motors employing conical bearings. Also, as used herein, the terms "axially" or "axial direction" include a direction along a centerline axis length of the shaft (i.e., along axis 260 of shaft 202 shown in FIG. 2), and the terms "radially" or "radial direction" include a direction perpendicular to the centerline axis 260, and passing through centerline axis 260.

Referring to the drawings wherein identical reference numerals denote the same elements throughout the various views, FIG. 1 illustrates a top plan view of a typical disk drive data storage system 110 in which embodiments described herein are useful. Clearly, features of the discussion and claims are not limited to this particular design, which is shown only for purposes of the example. Disk drive 110 includes base plate 112 that is combined with cover 114 forming a sealed environment to protect the internal components from contamination by elements outside the sealed environment. Disk drive 110 further includes disk pack 116, which is mounted for rotation on a spindle motor (as described in FIG. 2) by disk clamp 118. Disk pack 116 includes a plurality of individual discs, which are mounted for co-rotation about a central axis. Each disk surface has an associated read and write head 120, which is mounted to disk drive 110 for communicating with the disk surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disk drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Referring to FIG. 2, a sectional side view is illustrated of a contemporary spindle motor as used in a disk drive data storage system 110, incorporating a base plate 220. This fluid dynamic bearing motor includes a rotatable component that is relatively rotatable about a stationary component, defining a journal bearing 206 therebetween. In this example, the rotatable components include shaft 202 and hub 210. Hub 210 includes a disk flange, which supports disk pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 204 and stator 211, which are affixed to base plate 220. Stator 211 is comprised of lamination stack 214 and stator windings 217. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While FIG. 2 is described herein with a lubricating fluid, those skilled in the art will appreciate that useable fluids include a liquid, a gas, or a combination of a liquid and a gas.

Turning now to FIG. 3, a sectional side view is shown of a fluid dynamic bearing motor incorporating a fixed shaft 302 and folded fluid channels, in accordance with an embodiment. A journal bearing 306 is defined between shaft 302 and sleeve 304, the shaft 302 and sleeve 304 positioned for relative rotation. As described in FIG. 2, magnet 316 interacts with stator 314 to cause the sleeve 304 and hub 310 to rotate. The shaft 302 is fixed to a base structure. Here, shaft 302 is fixed to base cup 319, and base cup 319 is fixed to baseplate 320. Alternatively, base cup 319 and baseplate 320 may be an integral component that is fixed to shaft 302. As used herein, "base structure" includes a base cup, a baseplate, or an integral base cup and baseplate.

Fluid sealing system 330, comprising radially extending channel portion 331 and axially extending channel portion 332, forms an active pumping seal. As used herein, "active pumping seal," includes a type of fluid seal that builds pressure dynamically, and that employs active pumping when the shaft and the sleeve (or relatively rotatable components) are relatively rotating. The pressure is created by relative motion between the stationary and rotatable components. Fluid sealing system 330 is a folded fluid channel. As used herein, "folded fluid channel" includes an axially extending channel portion and a radially extending channel portion. For example, radially extending channel portion 331 and axially extending channel portion 332 comprises a folded fluid channel. Fluid sealing system 340 is also a folded fluid channel, comprising radially extending channel portion 341 and axially extending channel portion 342. These channels 331, 332, 341 and 342 are defined by facing surfaces of a stationary component and a rotatable component.

The fluid sealing systems 330 and 340 are limited to occupying at least a portion of the same axial space as the bearing 306, and positioned radially outboard of the bearing 306. Thus, the fluid sealing systems 330 and 340 are shaped for maximizing axial span for bearing 306, and do not occupy axial space that bearing 306 could otherwise utilize. Also, by maximizing axial length for the bearing 306, angular stiffness is increased, and shaft 302 better resists gyroscopic rocking of the facing bearing surfaces.

In an embodiment, the bearing 306 employs asymmetric fluid sealing in which a grooved pumping seal is employed at fluid sealing system 330, and a capillary seal is employed at fluid sealing system 340. In another embodiment, a grooved pumping seal is employed at fluid sealing system 330, and grooves are situated on at least one of a facing surface of radially extending channel portion 331 (grooves 464 as shown in FIG. 4B), and a facing surface of axially extending channel portion 332 (grooves 324). In yet another embodiment, a capillary seal forms on a facing surface of axially extending channel portion 332 when the rotatable component is stationary. When the rotatable component is relatively rotating, a facing surface of radially extending channel portion 331 forms an active pumping seal.

Top grooves 326 and bottom grooves 328 are formed on shaft 302, although may alternatively be formed on the opposing facing surface of the sleeve. These asymmetric grooves may have a pattern including a herringbone pattern or a sinusoidal pattern inducing fluid flow in the interfacial region and generating a localized region of dynamic high pressure and radial stiffness. These grooves are situated at an upper and a lower axial portion of the journal bearing 306, separated by a separator region. In an embodiment, the bottom grooves 328 are formed with an asymmetric leg that is longer in length than an asymmetric leg of the top grooves 326. The extended leg of the top grooves 326 is formed with a length to limit or prevent negative pressure in the separator region. The extended leg of the bottom grooves 328 is formed to prevent reverse fluid circulation flow, when the fluid circulation is intended to flow upward from bottom grooves 328 toward top grooves 326. Also, less power is consumed by the motor by reducing the extended length of the top grooves 326 asymmetric leg.

The shaft 302 is attached to a top cover 312, for increasing rigidity of the shaft 302 and entire motor. By attaching the shaft 302 to the top cover 312, the cantilever gyro is substantially centered at an axial midpoint of the bearing 306, since the shaft 302 is attached at both axial ends. Also, by attaching a shaft to a top cover and to the motor baseplate, the radial and angular stiffnesses of a bearing structure are substantially increased over that of contemporary motor designs employing a rotating shaft in which the support for the bearing structure is attached only to a baseplate. Further, because shaft 302 is fixed and attached at both axial ends, the axial thickness of the base plate 320 and/or base cup 319 may be minimized without loss of structural rigidity.

A single thrust surface 321 is created by pressure generating grooves formed on at least one radially extending facing surface of the sleeve 304 and the motor cup 319 (or baseplate 320). These grooves provide pressure as the sleeve 304 rotates, and support the sleeve 304 and hub 310 for constant rotation.

A limiter 308 is employed to limit axial movement of the rotatable component with respect to the stationary component. In the example shown, the facing surfaces of the limiter 308 and the sleeve 304 limit the axial movement. The limiter component 308 is attached to, or in contact with, at least one of the shaft 302 and the top cover 312.

A recirculation passageway 318 is formed through the sleeve 304 for fluidly connecting the first axial end of the bearing at or near the fluid sealing system 330 with the second axial end of the bearing at or near the fluid sealing system 340. Fluid recirculation is further discussed in FIG. 5.

The sleeve 304 and the hub 310 (both rotatable components) have facing surfaces shaped with an axial step engagement 350A and a radial step engagement 350B, for affixing the sleeve 304 and the hub 310. Certainly, offset load capability and total indicated runout (TIR) are design concerns. In contemporary designs having a smaller engagement area, the joint at facing surfaces of the sleeve and hub may shift. Both axial and radial engagement having lengthy surface areas may be utilized, providing a stronger joint at the facing surface of the sleeve 304 and the hub 310.

As illustrated in FIG. 4A, a sectional side view is shown of an enlarged portion of the fluid dynamic bearing motor as in FIG. 3, illustrating details of a folded fluid channel and grooves, in accordance with an embodiment. Grooves 354 are situated on the surface of the limiter 308 that faces sleeve 304 at axially extending channel portion 332. Alternatively, grooves may be formed on the sleeve 304 (grooves 324, FIG. 3). When the sleeve 304 is rotating, grooves 354 (or grooves 324) create an active pumping seal.

In an embodiment, grooves are formed on the axially extending channel 332, and the gap is increased at the radially extending channel 331 between the sleeve 304 and the limiter 308, resulting in reduced power consumption by the motor.

FIG. 4B is a top plan view of an enlarged portion of the fluid dynamic bearing motor taken from the reference 4B as shown in FIG. 3. Here, grooves 464 are employed on radially extending portion 331 of a surface of the folded fluid channel 330, in accordance with an embodiment. As shown, spiral grooves 464 are formed on the axial top of sleeve 304 facing limiter 312. Alternatively, grooves may be employed on the limiter 312 facing the axial top of the sleeve 304. Grooves 464 form a grooved pumping seal within the fluid channel 330.

Referring to FIG. 5, a sectional side view is shown of an enlarged portion of the fluid dynamic bearing motor of FIG. 3, illustrating pressure, oil flow, and pumping details of the motor, in accordance with an embodiment. Bearing system 306 utilizes asymmetric fluid sealing in which a grooved pumping seal (a lower fluid volume and higher stiffness seal) is employed at fluid sealing system 330, and a capillary seal (a higher fluid volume and lower stiffness seal) is employed at fluid sealing system 340. That is, when the sleeve 304 is rotating relative to the shaft 302, grooves 324 (or alternatively, grooves 354 of FIG. 4A, or grooves 464 of FIG. 4B) create an active pumping seal forcing fluid as shown by arrow 510A. In an embodiment, when the sleeve 304 is stationary relative to the shaft 302, and centrifugal force subsides, a capillary seal forms on a facing surface of axially extending channel portion of fluid sealing system 330.

Thrust surface 321 provides an upward force (pressure 506C) separating the rotatable component and the stationary component, generates pumping pressure and drives fluid recirculation toward fluid bearing system 306, as shown by pumping arrow 510D to pump fluid as shown by oil flow arrow 508B.

Top grooves 326 generate a localized region of dynamic high pressure and radial stiffness (pressure 506A), and pump fluid as shown by arrows 510B. Similarly, bottom grooves 328 generate a localized region of dynamic high pressure and radial stiffness (pressure 506B), and pump fluid as shown by arrows 510C. The fluid flows through fluid bearing system 306 as shown by oil flow arrows 508B and 508C, and then through fluid recirculation passageway 318, formed through the sleeve 304, in the direction as shown by oil flow arrow 508A. Recirculation of the fluid purges any air within the journal bearing system 306.

FIG. 6 is a graphical illustration of operating radial vibration response simulations for three prior art designs versus an embodiment. Sweep frequency (Hz.) is plotted against displacement/acceleration amplitude (μin/g). In the prior art designs, measurements of resonance modes excited from the spindle/disk rocking mode coincide with harmonics from the rotating shaft designs. As illustrated by the graph, an embodiment (having a rigid structure) may exhibit significantly lower amplitude responses at higher frequencies than prior art motor designs employing a rotating shaft design.

The fluid dynamic bearing motors described herein may further comprise a reservoir for a lubricating oil, an example of which is provided in FIG. 7A, which provides a sectional side view of a fluid dynamic bearing motor incorporating the reservoir for the lubricating oil in accordance with some embodiments.

As illustrated in FIG. 7A, the reservoir may be established in at least diverging gap section 770A, which diverging gap section 770A shares a first face with a limiter 308 and a second, oblique face with a hub 310, such that the distance between the first face (e.g., face of the limiter 308) and the second face (e.g., face of the hub 310) lessens as the fluid reservoir deepens (e.g., in a direction toward the baseplate 320). The distance between the first face and the second face of the diverging gap section 770A may also be described in view of FIG. 7B. As illustrated in FIG. 7B, the distance between the first face (e.g., face of the limiter 308) and the second face (e.g., face of the hub 310) at a top portion of the reservoir (e.g., topmost meniscus of capillary seal 772B in FIG. 8A) may be A', and the distance between the first face and the second face at the bottom of limiter 308 may be A, such that A'>A.

Turning back to FIG. 7A, the diverging gap section 770A may be outside of and substantially parallel to a fluid dynamic bearing of the motor (e.g., journal bearing 306 provided in FIGS. 3 and 5) in any given cross section of the motor. For example, the limiter 308 and the hub 310 may define a channel or passageway comprising the diverging gap section 770A, wherein the channel or passageway is substantially parallel to a fluid dynamic bearing such as a journal bearing. The diverging gap section 770A may be substantially cylindrical and concentric with a fluid dynamic bearing of the motor (e.g., journal bearing 306 provided in FIGS. 3 and 5) when the cross section of the diverging gap section 770A is viewed as a volume of revolution about the centerline axis of the motor. For example, the limiter 308 and the hub 310 may define a channel or passageway comprising the diverging gap section 770A, wherein the channel or passageway is substantially cylindrical and concentric with a fluid dynamic bearing such as a journal bearing. Functionally, a diverging gap such as diverging gap section 770A is configured for passive purging of air (e.g., air bubbles) within the lubricating oil.

As further illustrated in FIG. 7A, the reservoir may be further established in at least diverging gap sections 770A and 770B, which diverging gap section 770A is described herein above, and which diverging gap section 770B shares a first, oblique face with the limiter 308 and a second face with a sleeve 304, such that the distance between the first face (e.g., face of the limiter 308) and the second face (e.g., face of the sleeve 304) lessens as the fluid reservoir deepens (e.g., in a direction toward the shaft 302). The distance between the first face and the second face of the diverging gap section 770B may also be described in view of FIGS. 7B and 7C. As illustrated in FIG. 7C, the distance between the first face (e.g., face of the limiter 308) and the second face (e.g., face of the sleeve 304) at a radial distance farther from the centerline axis of the motor may be B', and, as illustrated in FIG. 7B, the distance between the first face and the second face at a radial distance closer to the centerline axis of the motor may be B, such that B'>B. Furthermore, in view of FIGS. 7B and 7C, the relationship of the distances between the first face and the second face in diverging gap sections 770A and 770B may be A'>A>B'>B. In some embodiments, A may be equal to B', such that the relationship of the distances between the first face and the second face in diverging gap sections 770A and 770B may be A'>A≥B'>B.

Turning back to FIG. 7A, the diverging gap section 770B may be substantially perpendicular to diverging gap section 770A (and/or diverging gap section 770C, described herein below) and/or a fluid dynamic bearing of the motor (e.g., journal bearing 306 provided in FIGS. 3 and 5) in any given cross section of the motor. For example, the limiter 308 and the sleeve 304 may define a channel or passageway comprising the diverging gap section 770B, wherein the channel or passageway is substantially perpendicular to diverging gap section 770A or a fluid dynamic bearing such as a journal bearing. Furthermore, the diverging gap section 770B may be fluidly connected to diverging gap section 770A (and/or diverging gap section 770C, described herein below). The diverging gap section 770B may be substantially annular and concentric with a fluid dynamic bearing of the motor (e.g., journal bearing 306 provided in FIGS. 3 and 5) when the cross section of the diverging gap section 770B is viewed as a volume of revolution about the centerline axis of the motor. For example, the limiter 308 and the sleeve 304 may define a channel or passageway comprising the diverging gap section 770B, wherein the channel or passageway is substantially annular and concentric with a fluid dynamic bearing such as a journal bearing. Functionally, a diverging gap such as diverging gap sections 770A and 770B is configured for passive purging of air (e.g., air bubbles) within the lubricating oil.

As even further illustrated in FIG. 7A, the reservoir may be even further established in at least diverging gap sections 770A, 770B, and 770C, which diverging gap sections 770A and 770B are described herein above, and which diverging gap section 770C shares a first, oblique face with the limiter 308 and a second face with a sleeve 304, such that the distance between the first face (e.g., face of the limiter 308) and the second face (e.g., face of the sleeve 304) lessens as the fluid reservoir deepens (e.g., in a direction toward the baseplate 320). The distance between the first face and the second face of the diverging gap section 770C may also be described in view of FIG. 7C. As illustrated in FIG. 7C, the distance between the first face (e.g., face of the limiter 308) and the second face (e.g., face of the sleeve 304) at an axial distance closer to the baseplate 320 of the motor may be C', and the distance between the first face and the second face at an axial distance farther from the baseplate 320 of the motor may be C, such that C'>C. Furthermore, in view of FIGS. 7B and 7C, the relationship of the distances between the first face and the second face in diverging gap sections 770A, 770B, and 770C may be A'>A>B'>B>C'>C. In some embodiments, A may be equal to B' and/or B may be equal to C', such that the relationship of the distances between the first face and the second face in diverging gap sections 770A, 770B, and 770C may be A'>A≥B'>B≥C'>C.

Turning back to FIG. 7A, the diverging gap section 770C may be substantially parallel to diverging gap section 770A and/or a fluid dynamic bearing of the motor (e.g., journal bearing 306 provided in FIGS. 3 and 5) in any given cross section of the motor. For example, the limiter 308 and the sleeve 304 may define a channel or passageway comprising the diverging gap section 770C, wherein the channel or passageway is substantially parallel to diverging gap section 770C or a fluid dynamic bearing such as a journal bearing. The diverging gap section 770C may be substantially cylindrical and concentric with a fluid dynamic bearing of the motor (e.g., journal bearing 306 provided in FIGS. 3 and 5) when the cross section of the diverging gap section 770C is viewed as a volume of revolution about the centerline axis of the motor. For example, the limiter 308 and the sleeve 304 may define a channel or passageway comprising the diverging gap section 770C, wherein the channel or passageway is substantially cylindrical and concentric with a fluid dynamic bearing such as a journal bearing. Functionally, a diverging gap such as diverging gap sections 770A, 770B, and 770C is configured for passive purging of air (e.g., air bubbles) within the lubricating oil.

Grooves 326 may be situated on shaft 302 at an upper portion of a journal bearing 306. Such grooves 326 may be asymmetric and/or may have a herringbone pattern or a sinusoidal pattern as described herein above. The fluid dynamic bearing motor may further comprise grooves 324 and/or grooves 354, which may be situated in a channel closer to a central axis of the fluid dynamic bearing motor than diverging gap section 770A. As such, grooves 324 and/or grooves 354 may be situated in a channel other than that of diverging gap section 770A, which comprises capillary seal 772. With respect to grooves 324, such grooves 324 may be situated on at least one surface of a pair of surfaces that face and define radially extending channel 331. As illustrated in FIG. 7A, grooves 324 may be situated on a first surface at the top of a sleeve 304 (e.g., grooves 324A in FIG. 10A), which first surface faces a first surface of a limiter 308 to define radially extending channel 331. As alternatively illustrated in FIG. 7A, grooves 324 may be situated on the first surface of the limiter 308 (e.g., grooves 324B in FIG. 10B), which first surface faces the first surface at the top of sleeve 304 to define radially extending channel 331. With respect to grooves 354, such grooves 354 may be situated on at least one surface of a pair of surfaces that face and define axially extending channel 332. As further alternatively illustrated in FIG. 7A, grooves 354 may be situated on a second surface at the top of the sleeve 304 (e.g., grooves 354A in FIG. 10A), which second surface faces a second surface of the limiter 308 to define axially extending channel 332. As even further alternatively illustrated in FIG. 7A, grooves 354 may be situated on the second surface of the limiter 308 (e.g., grooves 354B in FIG. 10B), which second surface faces the second surface at the top of the sleeve 304 to define axially extending channel 332. A person having ordinary skill in the art will recognize that grooves 324 and 354 are representations of grooves configured to pump lubricating oil into one or more bearings of the fluid dynamic bearing motor and/or away from any open ends of the fluid dynamic bearing motor (e.g., open end of reservoir comprising capillary seal). Additional functions and characteristics of the foregoing grooves (e.g., 326, 324, and 354) are described herein above.

Turning back to the reservoir, the orientation and placement of the reservoir may allow the reservoir to be filled with a lubricating oil 782 using a dispenser 780 for the lubricating oil 782 during assembly of the fluid dynamic bearing motor. The reservoir may be filled with a predetermined amount (e.g., moles or mass) of the lubricating oil 782 using the dispenser 780 under ambient (e.g., standard ambient temperature and pressure) conditions or under sub-ambient (e.g., standard temperature and below standard pressure; below standard temperature and below standard pressure; etc.) conditions. Under ambient conditions, the predetermined amount of the lubricating oil 782 may be dispensed through, for example, a high-precision, pneumatically controlled syringe. Under sub-ambient conditions (e.g., at least partial vacuum), the predetermined amount of the lubricating oil 782 may be dispensed through, for example, a microdispenser such as a MicroDrop® microdispenser, which may provide droplets of lubricating oil 782 ranging from 30 µm to 100 µm in size. The MicroDrop® microdispenser may further provide droplets of lubricating oil 782 at a velocity of 1.5 m/s to 3 m/s, or more, allowing the lubricating oil to be dispensed from a distance, rather than inserting, for example, a syringe needle into the reservoir of the fluid dynamic bearing motor. The predetermined amount of the lubricating oil 782 dispensed into the reservoir may work into various channels or passageways of the fluid dynamic bearing motor leaving a capillary seal 772 to seal the reservoir as provided in FIG. 7A.

In addition to the orientation and placement of the reservoir, the reservoir may have a volume that further allows the reservoir to be filled with the lubricating oil 782 using the dispenser 780 as illustrated in FIG. 7A. The reservoir may have a volume ranging from greater than the volume of lubricating oil used for the fluid dynamic bearing motor to a volume substantially equal to the volume of lubricating oil used for the fluid dynamic bearing motor. Even though the reservoir may be filled with a predetermined amount (e.g., moles or mass) of lubricating oil, the volume of the lubricating oil used in the fluid dynamic bearing motor may vary, for example, as shown in FIG. 8A by the meniscus of capillary seal 772B (e.g., warmer temperature and/or during disk drive activity) and the meniscus of capillary seal 772B (e.g., cooler temperature and/or during disk drive inactivity), which menisci delimit ΔV. The volume of the reservoir may be configured to take such a volume change into account. With respect to a reservoir having a volume substantially equal to the volume of lubricating oil used in the fluid dynamic bearing motor, such a reservoir is shown in FIG. 8A as including a hub 310A. In such a hub 310A, diverging gap section 770A continues up to at least the meniscus of capillary seal 772B (e.g., maximum volume of predetermined amount of lubricating oil for normal operating temperatures) before running to the top of the hub in parallel with the face of the limiter 308. With respect to a reservoir having a greater volume than the volume of lubricating oil used in the fluid dynamic bearing motor, such a reservoir is shown in FIG. 8B as including a hub 310B (hub 310 in FIGS. 7, 9, 10A, and 10B). In such a hub 310B, diverging gap section 770A continues through the meniscus of capillary seal 772B to the top of the hub. With respect to a reservoir having even a greater volume than the foregoing reservoir, such a reservoir is shown in FIG. 8C as including a hub 310C. In such a hub 310C, diverging gap section 770A continues up to at least the meniscus of capillary seal 772B before further diverging out in a further diverging section.

In addition to a capillary seal 772, the reservoir may be further sealed with a hub cap, examples of which are provided in cross section as hub cap 974 in FIGS. 10A and 10B, and which may be of the type shown in FIG. 9A as hub cap 974A or in FIG. 9B as hub cap 974B. When a cross section of the hub cap 974 is viewed as a volume of revolution about the centerline axis of the fluid dynamic bearing of the motor, the hub cap 974 may be substantially annular, with inner and outer diameter walls connected by an annulus, and concentric with a fluid dynamic bearing of the motor (e.g., journal bearing 306 provided in FIGS. 3 and 5). Both the hub cap 974A and the hub cap 974B are positioned entirely radially outside of the limiter 308. Such a hub cap 974 may comprise the same material as the hub 310, or the hub cap 974 may comprise a different material than the hub 310. For example, in some embodiments, the hub cap 974 may comprise plastic or metal. Such a hub cap 974 may be an overhanging hub cap, such as the hub cap 974A, illustrated in FIGS. 9A, 10A, and 10B as hanging over the hub 310 or the hub cap 974C, illustrated in FIG. 9B. Such a hub cap 974 may alternatively be seated on the hub, such as the hub cap 974B, with the outer diameter wall of the hub cap seated on a ridge, rim, or lip 975 machined into an outer perimeter of the hub 310. Whether an overhanging hub cap 974A or a hub cap 974B seated on a lip of the hub, the hub cap may be coupled to the hub 310 by a press or interference fit, an adhesive, or welding.

As illustrated in FIGS. 9A, 9B, 10A, and 10B, a hub cap 974 coupled to a hub 310 provides a trap 976. Along with additional space above the meniscus of capillary seal 772 in diverging gap section 770A, the trap 976 also provides a means to contain lubricating oil during a shock event (e.g., dropping a hard disk drive assembly comprising the fluid dynamic bearing motor). As described herein above, the volume of the reservoir may range from greater than the volume of lubricating oil used for the motor to a volume substantially equal to the volume of lubricating oil used for the motor. Should a shock event force the lubricating oil of the fluid dynamic bearing motor into the reservoir, the trap 976 provides a means to contain the lubricating oil within the fluid dynamic bearing motor and/or the reservoir of the fluid dynamic bearing motor.

As illustrated in FIGS. 9A, 9B, 10A, and 10B, a hub cap 974 coupled to a hub 310 further provides a gap 978. Like the trap 976, the gap 978 further provides a means to contain the lubricating oil within the motor and/or the reservoir of the motor; however, the gap 978 has an added function in that the gap 978 also allows for pressure equalization and air purging (e.g., purging of air bubbles within lubricating oil). The gap 978 provides the means to contain the lubricating oil by providing a labyrinth seal (e.g., a mechanical seal providing a tortuous path to help prevent leakage of the lubricating oil) between proximate surfaces of the hub cap 974 and the limiter 308. In some embodiments, the gap 978 measures at least 0.06 mm, 0.08 mm, 0.10 mm, 0.12 mm, 0.14 mm, 0.16 mm, 0.18 mm, 0.20 mm, or 0.22 mm from a surface of the hub cap 974 to a surface of the limiter 308. In some embodiments, the gap 978 measures no more than 0.22 mm, 0.20 mm, 0.18 mm, 0.16 mm, 0.14 mm, 0.12 mm, 0.10 mm, 0.08 mm, or 0.06 mm from a surface of the hub cap 974 to a surface of the limiter 308. Combinations of the foregoing may also be used to describe the measured distance between proximate surfaces of the hub cap 974 and the limiter 308. For example, in some embodiments, the gap 978 measures at least 0.06 mm and no more than 0.22 mm (i.e., between 0.06 mm and 0.22 mm) from a surface of the hub cap 974 to a surface of the limiter 308, including at least 0.08 mm and no more than 0.20 mm (i.e., between 0.08 mm and 0.20 mm), such as at least 0.08 mm and no more than 0.16 mm (i.e., between 0.08 mm and 0.16 mm), for example, at least 0.08 mm and no more than 0.12 mm (i.e., between 0.08 mm and 0.12 mm). Proximate surfaces of the hub cap 974 and the limiter 308 may be textured to further help prevent leakage of the lubricating oil 782. For example, in some embodiments, proximate surfaces of the hub cap 974 and the limiter 308 may be textured by roughening or with grooves (e.g., screw threads), providing a more torturous path to further help prevent leakage of the lubricating oil.

In addition to providing a means to contain a lubricating oil within a fluid dynamic bearing motor and/or a reservoir of the fluid dynamic bearing motor during a shock event, a labyrinth seal also provides a means to contain the lubricating oil within the motor and/or the reservoir of the motor in the absence of a shock event, as the labyrinth seal also functions to reduce evaporation of the lubricating oil or reduce the evaporation rate of the lubricating oil. As illustrated in FIGS. 9A, 9B, 10A, and 10B, a hub cap 974 coupled to a hub 310 provides a headspace above the lubricating oil, which headspace is defined in diverging gap section 770A by a limiter 308, a meniscus of capillary seal 772, the hub 310, and the hub cap 974. Whether the motor is idle or in operation, air flow through a gap 978 of the labyrinth seal formed between the limiter 308 and the hub cap 974 may be restricted such that the headspace above the lubricating oil may be saturated with vapor from the lubricating oil. As such, a dynamic system may be established by the labyrinth seal, in which dynamic system kinetically energetic molecules of the lubricating oil at a surface of the lubricating oil (e.g., the meniscus of capillary seal 772) may evaporate into the headspace and subsequently condense back into the lubricating oil at one or more surfaces including that of the limiter 308, the meniscus of capillary seal 772B, the hub 310, and the hub cap 974. Vapor phase molecules of the lubricating oil may condense back into the lubricating oil at the one or more surfaces due to a loss of kinetic energy in traversing the length and narrow width of the gap 978 of the labyrinth seal. Proximate surfaces of the hub cap 974 and the limiter 308 textured by roughening or with grooves (e.g., screw threads) may provide a more torturous path for vapor phase molecules of the lubricating oil to traverse, further reducing the evaporation of the lubricating oil or the evaporation rate of the lubricating oil.

In view of the foregoing description of reservoirs, hub caps, and associated features, FIGS. 10A and 10B will now be described.

FIG. 10A provides a sectional side view of a fluid dynamic bearing motor incorporating a reservoir and a hub cap in accordance with an embodiment. As illustrated, the fluid dynamic bearing motor of FIG. 10A comprises a reservoir established in a continually diverging gap comprising diverging gap sections 770A, 770B, and 770C. A hub cap 974 may be coupled to the hub 310 as shown in FIG. 10A, forming a trap 976 and a gap 978, each of which provides a means to contain the lubricating oil, for example, during a shock event. The gap 978 provides a labyrinth seal between proximate, optionally textured, surfaces of the hub cap 974 and the limiter 308. Grooves 324A or grooves 354A on the sleeve 304 provide for an active pumping seal described herein above, while a capillary seal 772, represented by a meniscus in FIG. 10A, is provided in a bottom section of diverging gap sections 770A.

FIG. 10B provides a sectional side view of a fluid dynamic bearing motor incorporating a reservoir and a hub cap in accordance with an embodiment. As illustrated, the fluid dynamic bearing motor of FIG. 10B comprises a reservoir established in a continually diverging gap comprising diverging gap sections 770A, 770B, and 770C. A hub cap 974 may be coupled to the hub 310 as shown in FIG. 10B, forming a trap 976 and a gap 978, each of which provides a means to contain the lubricating oil, for example, during a shock event. The gap 978 provides a labyrinth seal between proximate, optionally textured, surfaces of the hub cap 974 and the limiter 308. Grooves 324B or 354B on the limiter 308 provide for an active pumping seal described herein above, while a capillary seal 772, represented by a meniscus in FIG. 10B, is provided in a bottom section of diverging gap sections 770A.

As such, provided herein is a motor comprising a hub cap; a stationary component comprising a limiter; and a rotatable component comprising a hub and the hub cap, wherein the hub cap is positioned atop the hub, wherein the limiter and the sleeve include a pump seal therebetween, wherein the hub cap, the hub, and the limiter are positioned to form a reservoir therebetween for a lubricating oil, and wherein the distance between the hub and the limiter lessens as the reservoir deepens. In some embodiments, the hub cap is coupled to the hub by adhesive or an interference fit. In some embodiments, the hub cap is further positioned to form a labyrinth seal for reducing evaporation of the lubricating oil. In some embodiments, the hub cap is further positioned to form a gap between the hub cap and the limiter. In some embodiments, the gap measures less than 1 mm from the hub cap to the limiter. In some embodiments, the reservoir has a volume substantially equal to the volume of lubricating oil used for the motor.

Also provided herein is a motor comprising a hub cap; a stationary component comprising a limiter; and a rotatable component comprising a sleeve, a hub, and the hub cap, wherein the hub cap is coupled to the hub, wherein the hub cap, the hub, and the limiter are positioned to form a reservoir therebetween for a lubricating oil, and wherein the reservoir has a volume substantially equal to a volume of lubricating oil used for the motor. In some embodiments, the distance between the hub and the limiter lessens as the reservoir deepens. In some embodiments, the hub cap is further positioned to form a labyrinth seal for trapping the lubricating oil during a shock event. In some embodiments, the hub cap is further positioned to form a gap between the hub cap and the limiter. In some embodiments, the gap measures less than 1 mm from the hub cap to the limiter. In some embodiments, the limiter is further positioned to form a grooved pumping seal between the limiter and the sleeve. In some embodiments, the motor further comprises a recirculation passageway through the sleeve for fluidly connecting a first axial end of a fluid dynamic bearing to a second axial end of the fluid dynamic bearing.

Also provided herein is a motor comprising a trapping means for trapping a lubricating oil in a reservoir during a shock event; a stationary component comprising a limiter; and a rotatable component comprising a hub and the trapping means, wherein the trapping means is coupled to the hub, and wherein the trapping means, the hub, and the limiter are positioned to form a reservoir therebetween for a lubricating oil. In some embodiments, the reservoir has a volume substantially equal to a volume of lubricating oil used for the motor. In some embodiments, the distance between the hub and the limiter lessens as the reservoir deepens. In some embodiments, the trapping means is further positioned to form a gap between the trapping means and the limiter. In some embodiments, the gap measures less than 1 mm from the trapping means to the limiter. In some embodiments, the rotatable component further comprises a sleeve, and wherein the limiter is further positioned to form a grooved pumping seal between the limiter and a sleeve. In some embodiments, the motor further comprises a recirculation passageway through the sleeve for fluidly connecting a first axial end of a fluid dynamic bearing to a second axial end of the fluid dynamic bearing.

Also provided herein is an apparatus, comprising a sleeve; a limiter overlying the sleeve; a hub coupled to the sleeve; and a hub cap overlying the hub; wherein the limiter and the sleeve include a pump seal therebetween, the limiter and the sleeve define a first passageway substantially parallel to a journal bearing, the limiter, the hub, and the hub cap define a fluid reservoir substantially parallel to the first passageway, and a second passageway is substantially perpendicular to the first passageway and fluidly connects the first passageway to the fluid reservoir. In some embodiments, the first passageway is positioned outside of the journal bearing. In some embodiments, the distance between the hub and the limiter lessens as the fluid reservoir deepens. In some embodiments, the limiter, the hub, and the hub cap further define a labyrinth seal for trapping the lubricating oil during a shock event. In some embodiments, the apparatus further comprises a gap between the hub cap and the limiter. In some embodiments, the gap measures less than 1 mm from the hub cap to the limiter. In some embodiments, the apparatus further comprises a recirculation passageway through the sleeve for fluidly connecting a first axial end of the journal bearing to a second axial end of the journal bearing.

Also provided is an apparatus, comprising a stationary component; a rotatable component; a pump seal defined by the stationary component and the rotatable component; and a fluid dynamic bearing defined by the stationary component and the rotatable component, wherein, in cross section, a first channel is substantially parallel to the fluid dynamic bearing; a second channel is substantially perpendicular to the first channel; and a fluid reservoir is substantially parallel to the first channel, and wherein the second channel fluidly connects the fluid reservoir to the first channel. In some embodiments, the fluid reservoir has a volume substantially equal to a volume of lubricating oil used for the apparatus. In some embodiments, the rotatable component comprises a hub, and wherein the distance between the hub and the stationary component lessens as the fluid reservoir deepens. In some embodiments, the rotatable component further comprises a hub cap, and wherein the hub cap is positioned atop the hub to form a labyrinth seal for reducing the evaporation rate of the lubricating oil. In some embodiments, the hub cap is further positioned to form a gap measuring less than 1 mm from the hub cap to the stationary component. In some embodiments, the fluid dynamic bearing is a journal bearing, and the first channel and the fluid reservoir are concentric with the journal bearing. In some embodiments, the apparatus further comprises a recirculation passageway through a sleeve of the rotatable component for fluidly connecting a first axial end of the journal bearing to a second axial end of the journal bearing.

Also provided is an apparatus, comprising a sleeve; a limiter overlying the sleeve; a hub coupled to the sleeve; and a hub cap overlying the hub; wherein the limiter and the sleeve include a pump seal therebetween, wherein the limiter and the sleeve define a cylindrical passageway and an annular passageway, each passageway being concentric with the sleeve, and wherein the limiter, the hub, and the hub cap define a fluid reservoir fluidly connected to the cylindrical passageway by the annular passageway. In some embodiments, the fluid reservoir has a volume substantially equal to a volume of lubricating oil used for the apparatus. In some embodiments, the distance between the hub and the limiter lessens as the fluid reservoir deepens. In some embodiments, the limiter, the hub, and the hub cap further define a labyrinth seal for trapping the lubricating oil during a shock event. In some embodiments, the apparatus further comprises a gap between the hub cap and the limiter, wherein the gap measures less than 1 mm from the hub cap to the limiter. In some embodiments, the apparatus further comprises a recirculation passageway through the sleeve for fluidly connecting a first axial end of a fluid dynamic bearing to a second axial end of the fluid dynamic bearing.

A system and method are also provided for sealing a fluid dynamic bearing motor. A first and a second folded fluid channel are shaped for maximizing bearing axial span and establishing angular stiffness, to resist gyroscopic rocking of the facing bearing surfaces. The first folded fluid channel is limited to occupying at least a portion of the same axial space as the bearing. A first and a second fluid sealing system are connected to opposite axial ends of the bearing. The first fluid sealing system forms an active pumping seal to pump fluid during motor rotation. In an aspect, a top cover attached shaft, and a single thrust surface are employed, allowing for a rigid motor structure and power reduction in applications including high rotational speed disk drives. Also, by employing a rigid shaft design, significantly lower amplitude radial vibration responses are exhibited at higher frequencies than prior art motor designs.

Also provided herein is a fluid dynamic bearing motor comprising a bearing defined between a stationary component and a rotatable component, wherein the stationary component and the rotatable component are positioned for relative rotation; a shaft and a base structure affixed to the stationary component; a first fluid sealing system connected to a first axial end of the bearing; and a second fluid sealing system connected to a second axial end of the bearing, wherein the first fluid sealing system employs a first folded fluid channel and the second fluid sealing system employs a second folded fluid channel, the first and the second folded fluid channels defined by facing surfaces of the stationary component and the rotatable component, wherein the first fluid sealing system forms an active pumping seal for pumping fluid when the stationary component and the rotatable component are relatively rotating, wherein the first folded fluid channel is limited to occupying at least a portion of the same axial space as the bearing, and is positioned radially outboard of the bearing, and wherein the first and the second folded fluid channels are shaped for maximizing bearing axial span, for establishing angular stiffness and resisting gyroscopic rocking of the facing bearing surfaces. In some embodiments, the bearing employs an asymmetric fluid sealing system, wherein the active pumping seal is a grooved pumping seal at the first fluid sealing system, and a capillary seal is employed at the second fluid sealing system. In some embodiments, the active pumping seal of the first fluid sealing system is a grooved pumping seal, wherein grooves are situated on at least one of an axially extending portion of a facing surface of the first folded fluid channel and a radially extending portion of a facing surface of the first folded fluid channel. In some embodiments, the first fluid sealing system further forms a capillary seal on an axially extending portion of a facing surface of the first folded fluid channel when the rotatable component is stationary, and wherein the active pumping seal is formed on a radially extending portion of a facing surface of the first folded fluid channel when the stationary component and the rotatable component are relatively rotating. In some embodiments, the fluid dynamic bearing motor further comprises top grooves having an asymmetric groove pattern formed at the first axial end of the bearing and bottom grooves having an asymmetric groove pattern formed at the second axial end of the bearing, wherein the bottom grooves are formed with an asymmetric leg that is longer in length than an asymmetric leg of the top grooves. In some embodiments, the shaft is further attached to a top cover, for increasing rigidity of the shaft. In some embodiments, the fluid dynamic bearing motor further comprises a single thrust surface formed by grooves on at least one radially extending facing surface of the stationary component and the rotatable component, for providing a force to separate the rotatable component from the stationary component. In some embodiments, the fluid dynamic bearing motor further comprises a limiter formed by facing surfaces of the stationary component and the rotatable component, for limiting axial movement of the rotatable component with respect to the stationary component, wherein the limiter is attached to at least one of the shaft and a top cover. In some embodiments, the fluid dynamic bearing motor further comprises a recirculation passageway formed through the rotatable component for fluidly connecting the first axial end of the bearing with the second axial end of the bearing. In some embodiments, the rotatable component includes a sleeve and a hub, and wherein the sleeve and the hub have facing surfaces shaped with an axial and a radial step engagement.

Also provided herein, in a fluid dynamic bearing motor including a bearing defined between a stationary component and a rotatable component, wherein the stationary component and the rotatable component are positioned for relative rotation, and wherein a shaft and a base structure are affixed to the stationary component, is a method comprising actively pumping fluid from a first fluid sealing system, situated at a first axial end of the bearing, when the stationary component and the rotatable component are relatively rotating, wherein the first fluid sealing system employs a first folded fluid channel defined by facing surfaces of the stationary component and the rotatable component, wherein the first folded fluid channel includes a first axially extending channel portion and a first radially extending channel portion, and wherein the first folded fluid channel is limited to occupying at least a portion of the same axial space as the bearing, and positioned radially outboard of the bearing; and sealing a second axial end of the bearing with a second fluid sealing system, wherein the second fluid sealing system employs a second folded fluid channel defined by facing surfaces of the stationary component and the rotatable component. In some embodiments, the method further comprises asymmetrically sealing bearing fluid by way of a grooved pumping seal at the first axial end of the bearing, and a capillary seal at the second axial end of the bearing. In some embodiments, the method further comprises actively pumping the fluid with a grooved pumping seal, wherein grooves are situated on at least one of an axially extending portion of a facing surface of the first folded fluid channel and a radially extending portion of a facing surface of the first folded fluid channel. In some embodiments, the method further comprises sealing the first axial end of the bearing with a capillary seal situated at the first axially extending channel portion when the rotatable component is stationary, and actively pumping fluid from the first radially extending channel portion with an active pumping seal when the stationary component and the rotatable component are relatively rotating. In some embodiments, the method further comprises establishing bearing radial pressures and fluid pumping by employing top grooves having an asymmetric groove pattern at the first axial end of the bearing and employing bottom grooves having an asymmetric groove pattern at the second axial end of the bearing, wherein the bottom grooves are formed with an asymmetric leg that is longer in length than an asymmetric leg of the top grooves. In some embodiments, the shaft is attached to a top cover. In some embodiments, the method further comprises providing a force to separate the rotatable component from the stationary component by way of a single thrust surface with grooves on at least one radially extending facing surface of the stationary component and the rotatable component. In some embodiments, the method further comprises limiting axial movement of facing surfaces of the stationary component and the rotatable component by way of a limiter attached to at least one of the shaft and a top cover, the limiter positioned to face a surface of the rotatable component. In some embodiments, the method further comprises recirculating fluid from the first axial end of the bearing to the second axial end of the bearing by way of a recirculation passageway defined through the rotatable component. In some embodiments, the method further comprises maximizing engaging facing surfaces of a sleeve and a hub affixed to the rotatable component with an axial step engagement and a radial step engagement facing surface area.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. A motor comprising:
   a hub cap;
   a stationary component comprising a limiter; and
   a rotatable component comprising a hub and the hub cap,
      wherein the hub cap is positioned atop the hub and further positioned entirely radially outside of the limiter,
      wherein the limiter and a sleeve include a pump seal therebetween,
      wherein the hub cap, the hub, and the limiter are positioned to form a reservoir therebetween for a lubricating oil, and
      wherein a distance between the hub and the limiter lessens as the reservoir deepens.

2. The motor of claim 1, wherein the hub cap is coupled to the hub by adhesive or an interference fit.

3. The motor of claim 1, wherein the hub cap is further positioned to form a labyrinth seal for reducing evaporation of the lubricating oil.

4. The motor of claim 1, wherein the hub cap is further positioned to form a gap between the hub cap and the limiter.

5. The motor of claim 4, wherein the gap measures less than 1 mm from the hub cap to the limiter.

6. The motor of claim 1, wherein the reservoir has a volume substantially equal to the volume of lubricating oil used for the motor.

7. An apparatus, comprising:
   a sleeve;
   a limiter overlying the sleeve;
   a hub coupled to the sleeve; and
   a hub cap overlying the hub; wherein
      the hub cap is positioned entirely radially outside of the limiter,
      the hub cap and the limiter form an axially extending gap therebetween,
      the limiter and the sleeve include a pump seal therebetween,
      the limiter and the sleeve define a first passageway substantially parallel to a journal bearing,
      the limiter, the hub, and the hub cap define a fluid reservoir substantially parallel to the first passageway, and
      a second passageway is substantially perpendicular to the first passageway and fluidly connects the first passageway to the fluid reservoir.

8. The apparatus of claim 7, wherein the first passageway is positioned outside of the journal bearing.

9. The apparatus of claim 7, wherein a distance between the hub and the limiter lessens as the fluid reservoir deepens.

10. The apparatus of claim 7, wherein the limiter, the hub, and the hub cap further define a labyrinth seal for trapping the lubricating oil during a shock event.

11. The apparatus of claim 7, wherein the axially extending gap measures less than 1 mm from the hub cap to the limiter.

12. The apparatus of claim 7, further comprising a recirculation passageway through the sleeve for fluidly connecting a first axial end of the journal bearing to a second axial end of the journal bearing.

13. An apparatus, comprising:
   a stationary component;
   a rotatable component;
   a pump seal defined by the stationary component and the rotatable component; and
   a fluid dynamic bearing defined by the stationary component and the rotatable component,
      wherein, in cross section, a first channel is substantially parallel to the fluid dynamic bearing;

a second channel is substantially perpendicular to the first channel;

a fluid reservoir is substantially parallel to the first channel, and wherein the second channel fluidly connects the fluid reservoir to the first channel; and a gap between the stationary component and a hub cap, wherein the gap is directly above the fluid reservoir, and wherein further the hub cap is positioned entirely radially outside of a limiter.

14. The apparatus of claim 13, wherein the fluid reservoir has a volume substantially equal to a volume of lubricating oil used for the apparatus.

15. The apparatus of claim 13, wherein the rotatable component comprises a hub, and wherein a distance between the hub and the stationary component lessens as the fluid reservoir deepens.

16. The apparatus of claim 15, wherein the hub cap is positioned atop the hub to form a labyrinth seal for reducing the evaporation rate of the lubricating oil.

17. The apparatus of claim 16, wherein the gap measures less than 1 mm from the hub cap to the stationary component.

18. The apparatus of claim 13, wherein the fluid dynamic bearing is a journal bearing, and wherein the first channel and the fluid reservoir are concentric with the journal bearing.

19. The apparatus of claim 18, further comprising a recirculation passageway through a sleeve of the rotatable component for fluidly connecting a first axial end of the journal bearing to a second axial end of the journal bearing.

20. An apparatus, comprising:
a sleeve;
a limiter overlying the sleeve;
a hub coupled to the sleeve; and
a hub cap overlying the hub;
   wherein the hub cap is positioned entirely radially outside of the limiter,
   wherein the hub cap and the limiter form an axially extending gap therebetween,
   wherein the limiter and the sleeve include a pump seal therebetween,
   wherein the limiter and the sleeve define a cylindrical passageway and an annular passageway, each passageway being concentric with the sleeve, and
   wherein the limiter, the hub, and the hub cap define a fluid reservoir fluidly connected to the cylindrical passageway by the annular passageway.

21. The apparatus of claim 20, wherein the fluid reservoir has a volume substantially equal to a volume of lubricating oil used for the apparatus.

22. The apparatus of claim 20, wherein a distance between the hub and the limiter lessens as the fluid reservoir deepens.

23. The apparatus of claim 20, wherein the limiter, the hub, and the hub cap further define a labyrinth seal for trapping the lubricating oil during a shock event.

24. The apparatus of claim 20, wherein the axially extending gap measures less than 1 mm from the hub cap to the limiter.

25. The apparatus of claim 20, further comprising a recirculation passageway through the sleeve for fluidly connecting a first axial end of a fluid dynamic bearing to a second axial end of the fluid dynamic bearing.

* * * * *